United States Patent [19]

Cunningham et al.

[11] Patent Number: 4,653,321
[45] Date of Patent: Mar. 31, 1987

[54] METHOD OF AUTOMATICALLY MEASURING FLUID FLOW RATES

[75] Inventors: Richard D. Cunningham; Ronald D. Grose, both of Omaha, Nebr.

[73] Assignee: Enron Corp., Houston, Tex.

[21] Appl. No.: 742,328

[22] Filed: Jun. 7, 1985

[51] Int. Cl.⁴ ............................ G01F 7/00; G01F 1/68
[52] U.S. Cl. ........................................ 73/197; 340/606
[58] Field of Search ............... 73/195, 197, 202, 204; 340/606; 364/510

[56] References Cited

U.S. PATENT DOCUMENTS

| | | | |
|---|---|---|---|
| 1,254,871 | 1/1918 | Wilson | 73/197 |
| 2,425,720 | 8/1947 | Bergman . | |
| 2,607,640 | 8/1952 | Bergman . | |
| 2,764,022 | 9/1956 | Hague . | |
| 3,803,912 | 4/1974 | Ohno | 73/197 |
| 4,043,196 | 8/1977 | Trageser . | |
| 4,083,244 | 4/1978 | Agar et al. | 73/204 |
| 4,100,799 | 7/1978 | Bradham et al. . | |
| 4,100,800 | 7/1978 | Pelt . | |

FOREIGN PATENT DOCUMENTS

| | | | |
|---|---|---|---|
| 0538229 | 12/1976 | U.S.S.R. | 73/197 |
| 0687343 | 9/1979 | U.S.S.R. | 73/197 |

*Primary Examiner*—Herbert Goldstein
*Attorney, Agent, or Firm*—Donald F. Haas

[57] ABSTRACT

A method comprises providing at least two fluid flow channels of different sizes wherein each contain a temperature sensitive resistance fluid flow sensor. An electronic controller is provided with the electrical information from the temperature sensitive resistance fluid flow sensor. The electronic controller is provided with a data base including at least the calibration data between fluid flow rate and the electrical information from the resistance sensor and the designated fluid flow rates at which each of the flow channels other than the smallest that could be opened or closed. Next, the fluid whose flow rate is to be measured is caused to flow through the smallest flow channel. Then the electronic controller compares the flow rate through the smallest flow channel with the designated flow rate for the smallest channel and opens the next larger flow channel to fluid flow if the designated flow rate is exceeded or closes such flow channel if such designated flow rate is not exceeded. If the next largest channel is to be opened, the proceeding three steps are repeated for each succeeding pair of flow channels until the flow rate does not exceed the designated flow rate or until there are no more flow channels to be opened. Finally, the flow rate information from all of the flow channels is combined.

1 Claim, 3 Drawing Figures

METHOD OF AUTOMATICALLY MEASURING FLUID FLOW RATES

BACKGROUND OF THE INVENTION

The present invention relates to a method for the automatic measurement of fluid flow with the aid of an electronic controller. The invention particularly relates to the accurate measurement of fluid flow rates over a very wide range.

The prior art is replete with meters and measuring devices for measuring variable fluid flow rates within a piping system. Many of these devices have been incapable of accurately measuring the flow rate of the fluid when the flow rate varies over a wide range. U.S. Pat. Nos. 2,425,720, 2,607,640, 2,764,022, 4,100,799, and 4,100,800 all disclose devices which can measure fluid flow rates over a wide range by utilizing two mechanical flow rate measuring devices, one for low flow rates and the other for high flow rates.

Small thermally sensitive resistor elements of the semiconductor type have been employed in flow indicators. These thermistors, temperature-dependent resistor fluid sensors, operate by correlating the temperature of the resistor with the fluid flow rate. An electrical current may be passed through such an element at a constant voltage, thus heating the element to a temperature higher than ambient temperature. The rate of heat dissipation from the element and, accordingly, its ultimate temperature, is proportional to the velocity of fluid flow past the element. The change in current flowing in the circuit as the resistance of a thermally sensitive element changes with temperature may be used as a measure of flow velocity. U.S. Pat. No. 4,043,196 discloses a method for fluid flow measurement which utilizes a temperature sensitive resistive element disposed within the fluid flow path. The patent suggests that the information from the thermistor may be used in a digital or analog read-out, a storage means, or such other apparatus or combination thereof which may appropriately utilize the mass It is an object of the present invention to provide a device which is capable of accurately measuring fluid flow rates over a wide range with the aid of an electronic controller. Another object of the invention is to provide a method for measuring fluid flow employing a thermally sensitive electrical resistance element such as a thermistor, diode, transister, etc. in combination with other elements whereby the method is adapted to accurately measure high as well as low rates of fluid flow.

SUMMARY OF THE INVENTION

The present invention is a method of automatically measuring, with the aid of an electronic controller, fluid flow rates over a wide range with improved accuracy. The method comprises providing at least two fluid flow channels of different sizes which each contain a thermally sensitive resistance element positioned for measuring the rate of flow of fluid therethrough. The electronic controller is provided with a data base including at least the calibration data between fluid flow rate and the electrical information from the thermally sensitive resistance elements and the designated fluid flow rates at which each of the flow channels other than the smallest are to be opened or closed. The fluid whose flow rate is to be measured is caused to flow through the smallest flow channel and the electronic controller is provided with the electrical information from the thermally sensitive resistance element positioned therein. Next, in the electronic controller, the flow rate through the smallest flow channel is compared with the designated flow rate for the smallest flow channel. The next step is either opening the next larger flow channel to fluid flow if the designated flow rate is exceeded or closing such fluid flow channel if the designated flow rate is not exceeded. If the next largest flow channel is open, the last three steps are repeated for each succeeding pair of flow channels until the flow rate does not exceed a designated flow rate or until there are no more flow channels to be opened. Finally, the flow rate information from all of the flow channels is combined in the electronic controller and provided by the controller to a means for displaying such flow rate information. In one embodiment of the invention, the flow rate information is stored by the electronic controller. In another embodiment of the invention, the flow rate information is provided to a remote location for display and/or storing.

DETAILED DESCRIPTION OF THE INVENTION

Figure 1:
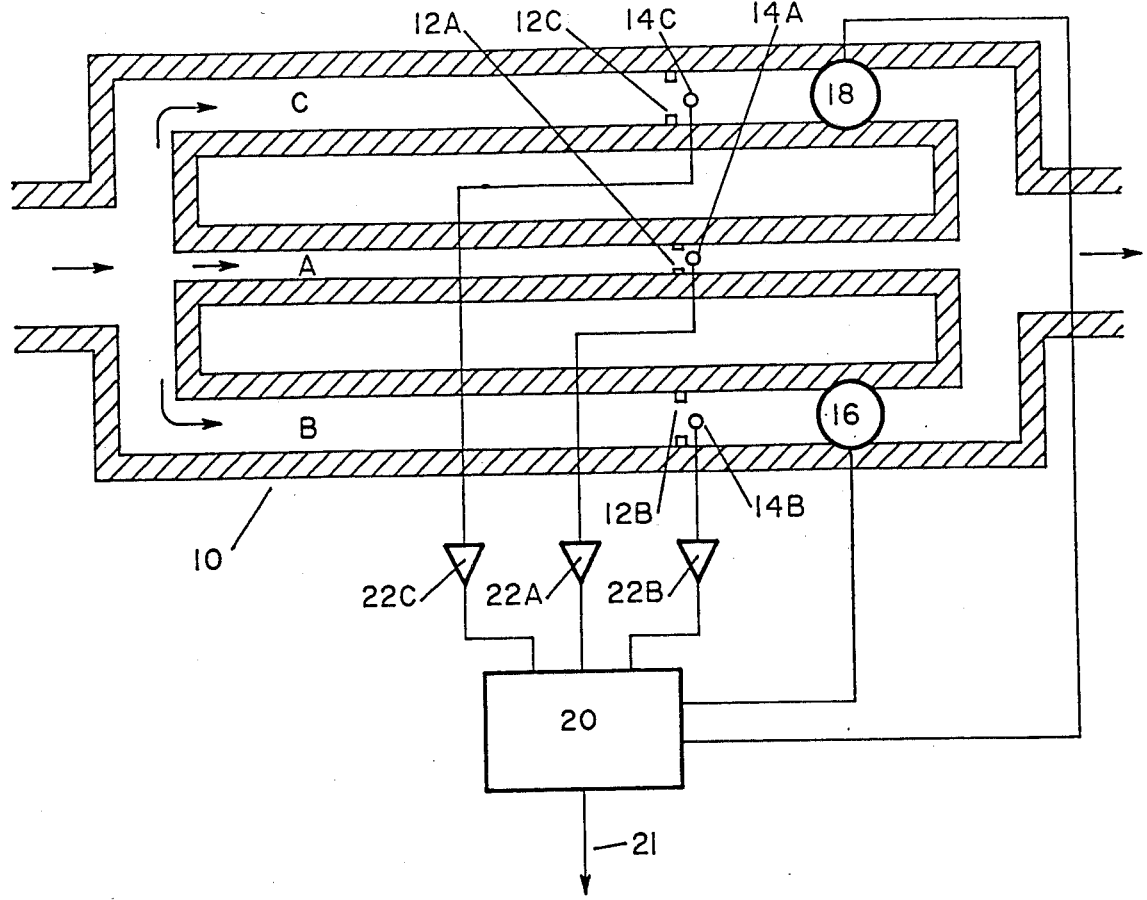
FIG. 1 is a schematic drawing illustrating the method of the invention wherein three flow channels of varying sizes are utilized.

The present invention combines the concepts of fluid flow rate measurement with temperature sensitive resistance fluid flow sensors and accurate fluid flow measurement over a wide range of flow rates by the use of more than one measurement device with the concept of automatic control of such a system and automatic measurement therewith through the utilization of an electronic controller. Thermistors, diodes, transistors, etc. can be used as the temperature sensitive resistance fluid flow sensor or element. The electronic controller can be a computer, a microprocessor, a logic block, etc.—any electronic device which can make the comparisons required by the method, make a decision based upon those comparisons and feed the decision back to the measurement system.

Thermistors are small thermally sensitive resistor elements which can be semiconductors, metallic wires, and the like. An electrical current may be passed through such an element at a constant voltage whereby it is heated to a temperature higher than ambient temperature. The rate of heat dissipation from the element and accordingly the temperature obtained by the resistant element is proportional to the velocity of flow fluid pass the element. The change in current flowing in the circuit has a resistance of the thermally sensitive element changes with temperature may be used as a measure of flow velocity. However, such a device is limited to the measurement of flow over a velocity range and usually is suitable for measurement of low velocities only. It is necessary to employ a comparatively high constant voltage to obtain measurable variations in the high velocity range. With this high voltage a large change in resistance due to a drop in the velocity of fluid flow may cause the sensitive thermal element to be damaged. Moreover, the characteristics of the resistance element may change over a wide velocity range and correspondingly wide current range.

It can be seen that it would be useful to restrict the use of the thermally sensitive resistance elements to relatively narrow flow rate ranges as opposed to using them to measure flow rate over a wide range. The present invention utilizes more than one flow channel for the fluid whose rate is to be measured, thus allowing for more accurate measurement of fluid flow rate by individual thermally sensitive resistance elements present in each flow channel because they can specialize in a particular flow rate range and also reducing the incidence of failure caused by using the thermally sensitive resistance elements over too wide a flow rate range. We have found that the use of three flow channels is preferred for residential and certain commercial gas uses. The smallest flow channel is used when only the pilot light is using gas and the flow rate of gas is very low. The next larger flow channel comes into use when an appliance such as a gas dryer or air conditioner is turned on, thereby requiring a larger flow of gas. Ultimately, all flow channels are used when space heating is required since this requires a much larger flow rate of gas.

The method of the present invention can be explained more clearly by referring to the drawings. In FIG. 1, it can be seen that fluid flows, as shown by the arrows, into a housing 10 which contains fluid flow channels A, B and C, from smallest to largest, and then out of the housing 10 back into the fluid conduit. Each flow channel is provided with an orifice 12 which is important for accurate correlation and measurement because the orifice reduces the sensitivity of the calibration of the system to variances in the system. The thermistor (other thermally sensitive resistance elements could be substituted for the thermistors) 14 is positioned in the flow channels just downstream of the orifice 12. The two larger flow channels are provided with valves 16 and 18 which are electrically connected to and operated by the electronic controller 20. The output of thermistors 14 A, B and C is supplied to bridge circuits 22 A, B and C, respectively, discussed further below, which then supply the electronic controller 20 with the desired flow rate information or with electrical information from which that information can be calculated by the electronic controller 20.

Figure 3:
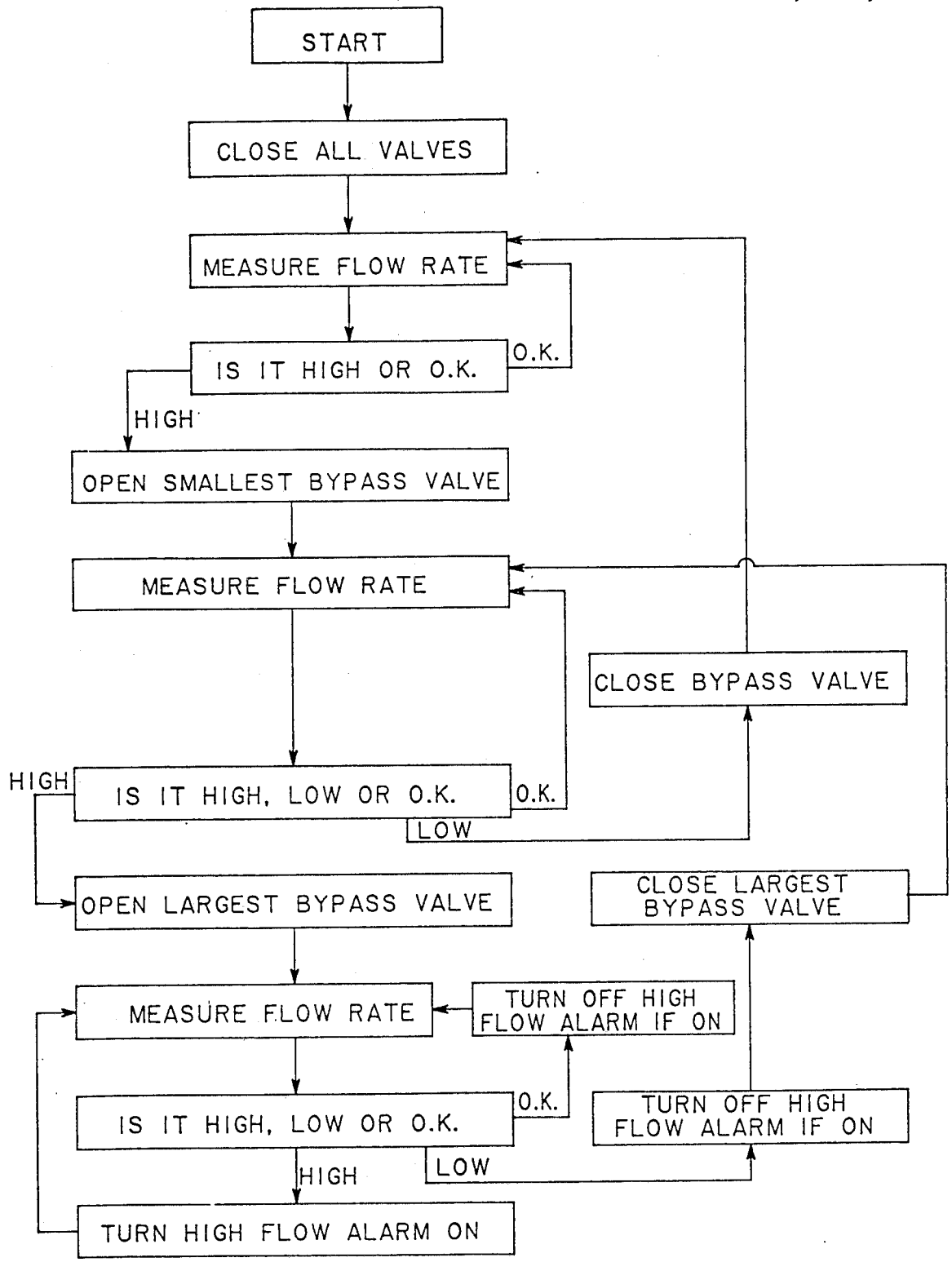
FIG. 3 is a flow diagram illustrating the electronic controller logic for controlling the system illustrated in FIG. 1.

The electronic controller 20 is provided with the logic sequence illustrated in FIG. 3 as well as the proper calibration data between fluid flow rate and the electrical information received from the thermistors 14 A, B and C and/or bridge circuits 22 A, B and C. Referring to both FIGS. 1 and 3, we see that, at the beginning, the electronic controller 20 closes valves 16 and 18 so that all of the fluid flow is directed through flow channel A. Next, the flow rate in channel A is measured. If it does not exceed the designated flow rate for channel A, then the controller 20 merely continues measuring the flow rate therein. If the flow rate in channel A exceeds the designated flow rate for that channel, the controller 20 then opens the valve 16 so that fluid can flow through channel B. The flow rate in this channel is measured. If it is lower than the designated flow rate for channel A, then the controller 20 closes valve 16 and measures the flow rate in channel A. If the flow rate in channel B is greater than the designated flow rate for channel A but does not exceed the designated flow rate for channel B, then the controller 20 merely continues to measure the flow rate in channel B. If the flow rate in channel B exceeds the designated flow rate for channel B, then the controller 20 opens valve 18 which allows fluid to flow through flow channel C.

Figure 2:
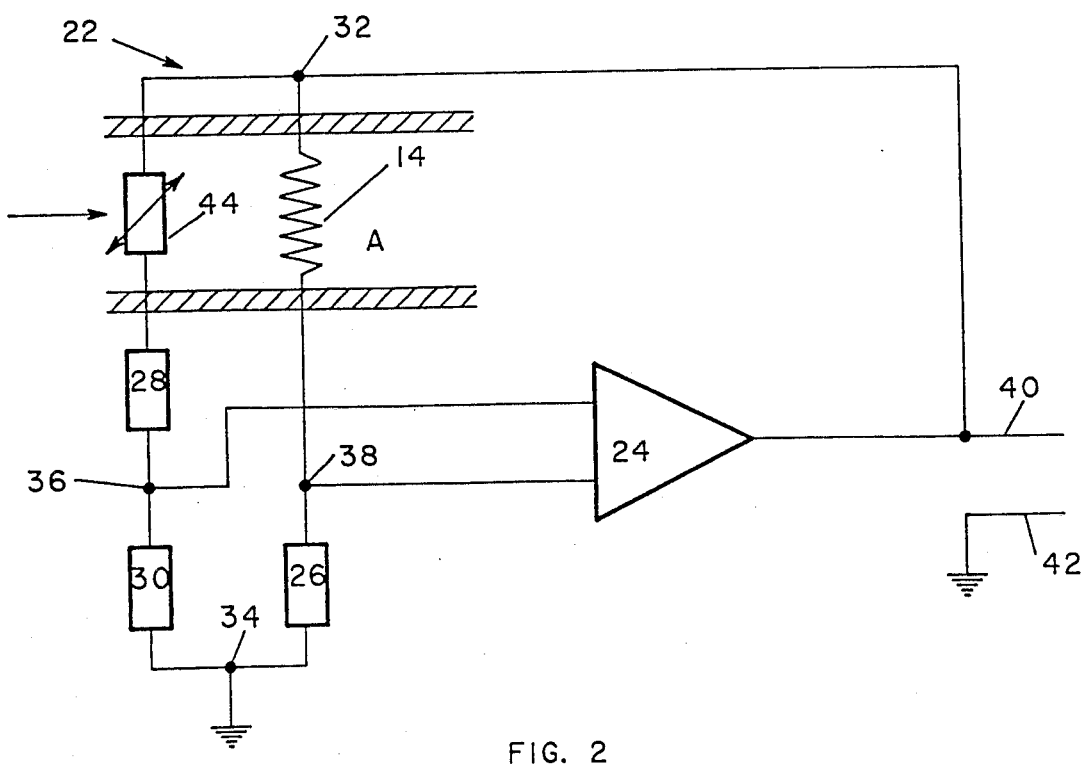
FIG. 2 is a circuit diagram which illustrates one embodiment of the invention wherein data from the thermally sensitive resistance element is transmitted to the electronic controller.

If the flow rate in flow channel C exceeds the designated flow rate for channel C, FIG. 3 provides that the controller 20 will turn on a high flow alarm (not shown in FIG. 1). This high flow alarm may be necessary when a fluid leak occurs downstream of the flow measurement device. This is a highly advantageous safety feature of the device. After the alarm is turned on, the controller 20 continues to measure the flow rate through flow channel C. If the flow rate in flow channel C does not exceed the designated flow rate for flow channel C and is higher than the designated flow rate for flow channel B, then the controller 20 will turn the high flow alarm off if it is on and will continue to measure the flow rate in flow channel C. If the flow rate in flow channel C is below the designated flow rate for flow channel B, then the controller 20 will turn off the high flow alarm if it is on, close valve 18 and begin to measure the flow rate in flow channel B as before. The electronic controller 20 can be provided with a data base which includes the information necessary to translate the electrical information from the thermistors 14 A, B and C directly into flow rate information in the controller 20, thus obviating the need for bridge circuits 22 A, B and C. However, it is more common to use bridge circuits 22 A, B and C to perform part of this function because they increase the resolution and provide more accurate measurement. There are many possible variations for the bridge circuits. FIG. 2 discloses one possible bridge circuit which can be used to advantage in the present invention.

Referring to FIG. 2, thermistor 14 is disposed within a flow channel, A for example. Thermistor 14 carries an electrical current of controlled magnitude and supplies the actual value signal for the differential amplifier 24. The differential amplifier 24 holds the temperature of the thermistor 14 at a level somewhat above the average fluid temperature. If the fluid flow rate increases, the temperature of the thermistor 14 will drop, resulting in a change of resistance and hence, a change in the voltage drop across the thermistor 14 which is sensed at the input of the differential amplifier 24. The differential amplifier 24 then changes its output current until the predetermined temperature of the thermistor 14 is obtained again. Thus, the differential amplifier 24 continuously attempts to hold a temperature of the thermistor 14 at a constant temperature in spite of fluctuations in the fluid flow rate so that its output current may be used at the same time in a regulating device to show the prevailing fluid flow rate.

The measuring thermistor 14, which is temperature-dependent, may be connected in series with a fixed resistor 26 in a first arm of a measuring bridge which has a second arm consisting of series connected resistors 28 and 30. The arms of the bridge are connected in parallel at junctions 32 and 34. A reference voltage is taken at point 36 to one input of the differential amplifier 24 while the voltage at point 38 between the thermistor 14 and the fixed resistor 26 is taken to the second input of the differential amplifier 24. Bridge junctions 32 and 34 are then connected across the outputs of the differential amplifier 24 and are thus supplied with operating current. The output voltage of the differential amplifier 24, designated as V, may be used externally if contact 40 and 42 for the purpose of providing the electronic controller 20 with an input signal or, if the differential amplifier 24 also performs the functions of the electronic controller 20, for the purpose of providing an input signal to a display means for the flow rate information or to a storage means or to a remote location for display and/or storage. Electronic controller 20 provides an output 21 which goes to a means for displaying the flow rate information. This information may be stored in the electronic controller 20 or may be transmitted to a remote location for display or storage.

The current flowing through the thermistor 14 heats it until the input voltage to the differential amplifier 24 equals the voltage at the other input thereof or some predetermined voltage. The output of the differential amplifier 24 is thus a controlled current flowing into the circuit described above. If the fluid flow rate changes, the temperature of the thermistor also changes, as does its resistance, which causes a change in the voltage difference between point 36 and point 38. This causes the differential amplifier 24 to correct the output current supplied to points 32 and 34 until such time as the circuit is balanced or has reached a predetermined degree of imbalance. Accordingly, the output voltage V, as well as through the thermistor 14, constitutes a measure for the prevailing fluid flow rate.

In order to compensate for the influence of temperature of the fluid on the measured result, it may be suitable to supply a second thermistor 44 in the second arm of the circuit. The magnitude of the resistances of resistors 28, 30 and 44 should be chosen so that the power lost due to the current flowing through the second thermistor 44 is so low that its temperature is unaffected by changes of the bridge voltage but always corresponds substantially to the temperature of the air flowing around it.

The electronic controller receives the input of the various thermally sensitive resistor elements and causes the various valves to open and close according to the way in which it is programmed. FIG. 3 is a flow diagram which illustrates the electronic controller logic for controlling the system discussed above.

As can be seen, at the beginning all valves are closed and the flow rate is measured. If the flow rate is small and within the acceptable limits, then no change will be made in the system. If the gas flow rate is higher than the acceptable limit, then the smallest bypass valve will be opened and the flow rate will be measured again. If it is low then the smallest bypass valve will be closed. If it is within acceptable limits, no changes will be made. If it is high, then the largest bypass valve will be opened and the flow rate will be measured again. If it is low, the largest bypass valve will be closed and the intermediate procedure will be repeated. If it is acceptable, no changes will be made. If it is high, then the high flow rate alarm will be turned on.

We claim:

1. A method of automatically measuring, with the aid of an electronic controller, fluid flow rates over a wide range with improved accuracy, which comprises:
    a. Providing at least two fluid flow channels of different sizes each having orifices therein and each containing a temperature sensitive resistance fluid flow sensor positioned downstream and adjacent to said orifice for measuring the rate of flow of fluid through the flow channels,
    b. Providing the electronic controller with the electrical information from the temperature sensitive resistance fluid flow sensor,
    c. Providing the electronic controller with a data base including at least the calibration data between fluid flow rate and the electrical information from the temperature sensitive resistance fluid flow sensor and the designated fluid flow rates at which each of the flow channels other than the smallest are to be opened or closed,
    d. Causing the fluid whose flow rate is to be measured to flow through the smallest flow channel,
    e. Comparing in the electronic controller the flow rate through the smallest flow channel with the designated flow rate for the smallest flow channel,
    f. Opening the next larger flow channel to fluid flow if the designated flow rate is exceeded or closing such flow channel if such designated flow rate is not exceeded,
    g. If the next largest flow channel is opened, repeating steps d, e and f for each succeeding pair of flow channels until the flow rate does not exceed a designated flow rate or until there are no more flow channels to be opened, and
    h. Combining in the electronic controller the flow rate information from all of the flow channels and providing it to a means for displaying flow rate information;

wherein, if the designated flow rate of the largest flow channel is exceeded, the electronic controller turns on a high flow alarm, continues to measure the flow rate in the largest flow channel, and turns off the high flow alarm when the flow rate through the largest channel no longer exceeds the designated flow rate for that flow channel.

* * * * *